(12) United States Patent
Uesugi et al.

(10) Patent No.: US 10,446,042 B2
(45) Date of Patent: Oct. 15, 2019

(54) OBSERVATION SYSTEM USING FLYING OBJECTS, AND OBSERVATION METHOD

(71) Applicant: PANASONIC INTELLECTUAL PROPERTY MANAGEMENT CO., LTD., Osaka (JP)

(72) Inventors: Mitsuru Uesugi, Kanagawa (JP); Tsuyoshi Osato, Saitama (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/762,877

(22) PCT Filed: Aug. 4, 2016

(86) PCT No.: PCT/JP2016/003606
§ 371 (c)(1),
(2) Date: Mar. 23, 2018

(87) PCT Pub. No.: WO2017/072988
PCT Pub. Date: May 4, 2017

(65) Prior Publication Data
US 2018/0277000 A1    Sep. 27, 2018

(30) Foreign Application Priority Data
Oct. 28, 2015    (JP) .................... 2015-212171

(51) Int. Cl.
*G08G 5/00* (2006.01)
*B64C 39/02* (2006.01)
(Continued)

(52) U.S. Cl.
CPC ......... *G08G 5/0078* (2013.01); *B64C 39/024* (2013.01); *B64D 47/08* (2013.01);
(Continued)

(58) Field of Classification Search
CPC ............................ B64C 39/024; G08G 5/0069
See application file for complete search history.

(56) References Cited

U.S. PATENT DOCUMENTS 9,834,305 B2 * 12/2017 Taylor .................. B64C 39/024
9,886,863 B2    2/2018 Kuhara
(Continued)

FOREIGN PATENT DOCUMENTS

DE    102013004881 A1    9/2014
JP    H11-296788 A    10/1999
(Continued)

OTHER PUBLICATIONS

Search Report issued in International Patent Application No. PCT/JP2016/003606, dated Oct. 4, 2016.
(Continued)

*Primary Examiner* — Paulos M Natnael
(74) *Attorney, Agent, or Firm* — Greenblum & Bernstein, P.L.C.

(57) ABSTRACT

Observing an observation area wider than a cruising distance of a drone, an acquiring observation data of all observation sections and analyzing all the observation area, even when it is impossible for the operator to go to the observation base due to a failure of a traffic infrastructure and when a failure of a communication infrastructure occurs. The drone flies through the observation section from the observation base, where the drone is on standby, to a next observation base to observe, to transmit all observation data after a first observation section stored in the drone to the next drone on standby at the observation base when the drone lands at the next observation base, and to deliver observation data of all observation sections to the observation base, which is a
(Continued)

destination, by sequentially repeating the performance of the transmitting of data between the drones in all observation sections.

19 Claims, 12 Drawing Sheets

(51) Int. Cl.
    *H04B 7/185*     (2006.01)
    *H04N 5/247*     (2006.01)
    *B64D 47/08*     (2006.01)
    *G08G 1/00*     (2006.01)
    *B64F 1/22*     (2006.01)
    *B64F 1/36*     (2017.01)
    *G08C 17/02*     (2006.01)

(52) U.S. Cl.
    CPC .............. *B64F 1/222* (2013.01); *B64F 1/362* (2013.01); *G08C 17/02* (2013.01); *G08G 1/00* (2013.01); *H04B 7/18504* (2013.01); *H04N 5/247* (2013.01); *B64C 2201/066* (2013.01); *B64C 2201/122* (2013.01); *B64C 2201/127* (2013.01); *B64C 2201/141* (2013.01); *G08C 2201/40* (2013.01)

(56) References Cited

U.S. PATENT DOCUMENTS

| | | | | |
|---|---|---|---|---|
| 10,112,712 | B1* | 10/2018 | Gentry | B64C 39/024 |
| 10,157,468 | B2* | 12/2018 | Kumeno | G06T 7/60 |
| 10,196,155 | B2* | 2/2019 | Martin | B64F 1/00 |
| 2015/0041598 | A1* | 2/2015 | Nugent | H02J 17/00 244/53 R |
| 2015/0158598 | A1* | 6/2015 | You | B64F 1/18 701/16 |
| 2017/0069214 | A1* | 3/2017 | Dupray | G08G 5/0021 |
| 2017/0111102 | A1* | 4/2017 | Fan | H04B 7/18504 |
| 2017/0300050 | A1* | 10/2017 | Naito | G05D 1/0088 |
| 2018/0222582 | A1* | 8/2018 | Ohata | B64C 39/02 |
| 2018/0237148 | A1* | 8/2018 | Hehn | B64C 39/024 |

FOREIGN PATENT DOCUMENTS

| | | |
|---|---|---|
| JP | 2004-70475 A | 3/2004 |
| JP | 2013-148532 A | 8/2013 |

OTHER PUBLICATIONS

The Extended European Search Report dated Sep. 3, 2018 for the related European Patent Application No. 16859229.3.

* cited by examiner

OBSERVATION SYSTEM USING FLYING OBJECTS, AND OBSERVATION METHOD

TECHNICAL FIELD

The present disclosure relates to an observation system and an observation method which cause a flying object to autonomously fly along an observation route preset on an observation area to observe a state of the observation area.

BACKGROUND ART

When a disaster affecting the road such as an earthquake occurs, in order to take immediate measures such as traffic regulation and restoration, it is necessary to inspect the road for an abnormality at an early stage and for example, in the national highway, when the earthquake with a seismic intensity of 4 or more occurs, the inspection results of the jurisdiction road will be reported within 3 hours.

In road inspection, an operator staying at a base such as an office or a branch office uses a car or the like to travel around the road. However, when the middle of the road becomes inaccessible, it is impossible to inspect the road ahead. In addition, there is a case where a failure occurs in traffic infrastructure such as roads and railroads and operators may not be able to go to the base, and in this case, it is not possible to carry out the inspection of the road itself. In addition, in a case where a failure occurs in a communication infrastructure such as a communication line, since it is impossible to communicate the inspection result of the road between the bases, it is not possible to report the inspection result of the whole of the jurisdiction road.

Therefore, it is conceivable for an operator to observe the situation of the road using a flying object such as a drone instead of circulating the road using a car or the like, and as a technique for observing using such a flying object, in the related art, there has been known a technique which causes a flying object to autonomously fly along a preset flight route, imaging with a camera mounted on the flying object and storing imaged data in a memory (see PTL 1).

CITATION LIST

Patent Literature

PTL 1: Japanese Patent Unexamined Publication No. 2013-148532

SUMMARY OF THE INVENTION

In a case where observation is performed using a flying object, although it is convenient to use a flying object that flies with an electric motor, since a cruising distance is limited due to a capacity problem of a battery, in a case where the observation area is wide, there is a case where it is difficult to observe the entire observation area with one flying object. In such a case, it is necessary to set a range that does not exceed the cruising distance as an observation section of one flying object, for the operator to stay at an observation base established with the observation section, and to make the flying object fly one by one.

Therefore, in the observation method using a flying object, although it is effective in that it is possible to inspect the entire road even if the middle of the road becomes inaccessible, problems still remain that in a case where it is impossible for the operator to go to the observation base due to the failure of the traffic infrastructure, it is impossible to observe the observation section and in a case where the failure of the communication infrastructure occurs, it is impossible to collect the observation results of all the observation sections in one place.

The present disclosure has been devised to solve such a problem of the prior art and a main object thereof is to provide an observation system and an observation method using a flying object that can perform observation of an observation area which is wider than a cruising distance of the flying object and, in addition, that is configured to be capable of acquiring an observation data of all the observation sections by the operator and performing analysis of all the observation areas, even in a case where it is impossible for the operator to go to the observation base due to the failure of the traffic infrastructure and in a case where the failure of the communication infrastructure occurs.

According to the present disclosure, there is provided an observation system which causes a flying object to autonomously fly along an observation route preset on an observation area to observe the situation of the observation area, the observation system including: a plurality of the flying objects that respectively are on standby at a plurality of observation bases which are disposed with a distance which does not exceed a cruising distance of the flying object and have an observer that observes the situation of the observation area, a storage which stores the observation data by the observer, and a communicator that transmits the observation data to another flying object, in which the flying object flies through an observation section from one of the observation bases on which the flying object is on standby to the next observation base among the observation bases to perform observation and when the flying object lands at the next observation base among the observation bases, the flying object performs data relay for transmitting all the observation data after the first observation section which is stored in the storage to the next flying object on standby at one of the observation bases.

In addition, according to the present disclosure, there is provided an observation method which causes a flying object to autonomously fly along an observation route preset on an observation area to observe the situation of the observation area, the method including: flying the flying object through an observation section from an observation base on which the flying object is on standby to the next observation base to perform observation, and performing data relay for transmitting all the observation data after the first observation section which is stored in the flying object to the next flying object on standby at the observation base thereof by the flying object when the flying object lands at the next observation base, and delivering the observation data of all the observation sections to the observation base which is a destination by sequentially repeating the performance of the data relay between the flying objects in all the observation sections.

According to the present disclosure, since a plurality of flying objects on standby at each of a plurality of observation bases observe the observation area while sharing the observation area, observation of the observation area wider than the cruising distance of the flying object can be performed efficiently. Since the data relay is sequentially repeated from the first flying object to the last flying object, the observation data of all the observation sections are stored in the storage of the last flying object. Thus, the operator can acquire observation data of all the observation sections and perform analysis of all the observation areas, even in a case where it is impossible for the operator to go to one of the observation bases due to the failure of the traffic infrastructure and in a case where the failure of the communication infrastructure occurs.

DESCRIPTION OF EMBODIMENT

Figure 1:
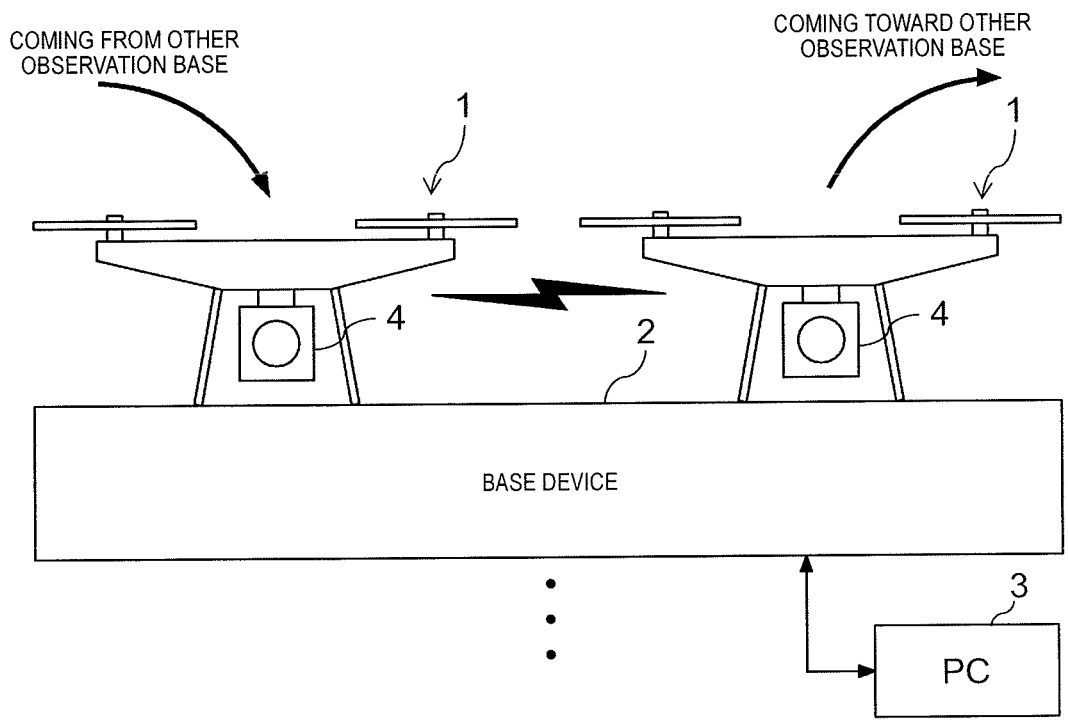
FIG. 1 is an explanatory view illustrating drone 1 and base device 2 according to this embodiment.

According to a first disclosure made to solve the above problem, there is provided an observation system which causes a flying object to autonomously fly along an observation route preset on an observation area to observe situation of the observation area, the observation system including: a plurality of the flying objects that respectively are on standby at a plurality of observation bases which are disposed with a distance which does not exceed a cruising distance of the flying object and have an observer that observes the situation of the observation area, a storage which stores observation data by the observer, and a communicator that transmits the observation data to another flying object, in which the flying object flies through an observation section from one of the observation bases on which the flying object is on standby to the next observation base among the observation bases to perform observation and when the flying object lands at the next observation base among the observation bases, the flying object performs data relay for transmitting all the observation data after a first observation section which is stored in the storage to the next flying object on standby at one of the observation bases.

According to this, since a plurality of flying objects on standby for each of a plurality of observation bases observe the observation area while sharing the observation area, observation of the observation area wider than the cruising distance of the flying object can be performed efficiently.

Since the data relay is sequentially repeated from the first flying object to the last flying object, the observation data of all the observation sections are stored in the storage of the last flying object. Thus, the operator can acquire an observation data of all the observation sections and perform analysis of all the observation areas, even in a case where it is impossible for the operator to go to one of the observation bases due to the failure of the traffic infrastructure and in a case where the failure of the communication infrastructure occurs.

In addition, a second disclosure is configured that, when the flying object of a relay source lands at one of the observation bases, the transmission of the observation data from the flying object of a relay source to the flying object of the relay destination is started and when the transmission of the observation data is ended, the flying object of the relay destination takes off and starts observation.

According to this, the data relay can be performed smoothly and quickly.

In addition, a third disclosure is configured so that the observer is a camera that images the observation area, and the observation data is imaged data output from the camera.

According to this, it is possible to analyze a situation of an observation area by imaged data obtained by imaging the observation area.

In addition, a fourth disclosure is configured to further include a power transmitter which is installed in each of the plurality of observation bases and supplies power for charging to the flying object on standby by contactless power transmission.

According to this, even if there is some error in the landing position of the flying object, the battery of the flying object can be charged.

In addition, a fifth disclosure is configured so that the communicator transmits the observation data to the next flying object by wireless communication.

According to this, even if there is some error in the landing position of the flying object, it is possible to transmit the imaged data. In this case, by adopting a high-speed short-range wireless communication method, it is possible to promptly transmit observation data between the flying objects.

In addition, a sixth disclosure is configured so that in a case where the previous flying object does not arrive at one of the observation bases on which the flying object is on standby at the scheduled timing, the flying object is immediately launched without being on standby for the arrival of the previous flying object.

According to this, even in a case where the operator cannot issue an observation start instruction since it is impossible for the operator to go to the observation base among the observation bases due to the failure of the traffic infrastructure, observation can be started. In this case, a time when the predetermined standby time elapses from the time of the disaster occurrence, which is the observation start time may be set as the scheduled timing and in a case where the previous flying object does not arrive even if the standby time passes, the flying object may be immediately launched.

In addition, a seventh disclosure is configured that, when the flying object arrives at one of the observation bases located at the end of the observation area, in a case where observation of all the observation sections is not ended, the plurality of flying objects return to each of the observation bases and perform observation of the observation section where the observation data is absent.

According to this, observation data of all the observation sections can be certainly delivered to the observation base, which is the destination, among the observation bases.

In addition, an eighth disclosure is configured that, when the flying object arrives at one of the observation bases located at the end of the observation area, in a case where one of the observation bases is unmanned, the plurality of flying objects return to each of the observation bases and continue to perform the data relay towards the manned observation base among the observation bases.

According to this, observation data of all the observation sections can be certainly delivered to a manned observation base among the observation bases.

In addition, a ninth disclosure is configured so that in a state where the observation data of all the observation sections are stored in the storage, when the flying object arrives at a manned observation base among the observation bases, the flying object ends the performance of the data relay.

According to this, unnecessary flying of a flying object can be avoided.

In addition, a tenth disclosure is configured, when the flying object arrives at one of the observation bases, in a case where there is no flying object on standby in the observation base and there is a need to fly the flying object toward the next observation base among the observation bases, the flying object flies to the next observation base after charging.

According to this, observation data of all the observation sections can be certainly delivered to the observation base, which is the destination, among the observation bases. Here, a case where it is necessary to fly to the next observation base is, for example, a case where the observation of some observation section is not ended, or a case where the arrived observation base among the observation bases is unmanned.

In addition, according to an eleventh disclosure, there is provided an observation method which causes a flying object to autonomously fly along an observation route preset on an observation area to observe situation of the observation area, the method including: flying the flying object through an observation section from an observation base on which the flying object is on standby to the next observation base to perform observation, and performing data relay for transmitting all the observation data after a first observation section which is stored in the flying object to the next flying object on standby at the observation base when the flying object lands at the next observation base, and delivering the observation data of all the observation sections to the observation base which is a destination by sequentially repeating the performance of the data relay between the flying objects in all the observation sections.

According to this, as in the first disclosure, the observation of the observation area wider than the cruising distance of the flying object can be performed and, further, the operator can acquire an observation data of all the observation sections and perform analysis of all the observation areas, even in a case where it is impossible for the operator to go to the observation base due to the failure of the traffic infrastructure and in a case where the failure of the communication infrastructure occurs.

Hereinafter, an embodiment of the present disclosure will be described with reference to the drawings.

FIG. 1 is an explanatory view illustrating drone 1 and base device 2 according to this embodiment.

This observation system is used for a road administrator of a national highway office or the like, for example, to inspect a situation of a road under jurisdiction when a disaster occurs, and includes drone (flying object) 1, base device 2, PC (setting device) 3.

Drone 1 autonomously flies along an observation route preset on an observation target area, observes a situation of the observation target area from the sky, and is disposed on a plurality of observation bases disposed along the observation route in a cruising distance of drone 1, that is, a distance in which drone 1 can fly continuously. In the present embodiment, drone 1 is equipped with camera (observer) 4, and the observation area is imaged by camera 4.

Base device 2 is installed at each of the observation bases. The observation bases are established in appropriate buildings existing in the vicinity of observation routes such as branch offices of national highway offices, government buildings such as city halls, station buildings, buildings, and the like. In base device 2, charge of drone 1 flying by electric power, storage of imaged data (observation data) by camera 4 of drone 1, and the like are performed.

At base device 2, at least one drone 1 is on standby in a state of charge end at a usual day, and for emergencies such as a disaster occurrence, drone 1 on standby at one of the observation bases where observation is started takes off and performs observation of the observation section between the next observation base among the observation bases and the observation base. In addition, at an intermediate observation base among the observation bases, drone 1 which has flown from the previous observation base lands and data relay for transmitting the imaged data to drone 1 of the relay destination on standby at the observation base was performed, and then the relay drone 1 of the relay destination takes off and observes the observation section with the next observation base and the intermediate observation base. In addition, drone 1 of the relay source is charged by base device 2 and is on standby at the observation base.

PC3 carries out various setting operations and the like concerning drones 1 and base devices 2 by the operator. For example, the flight route of drone 1 is set using PC3. In addition, in PC3, the imaged data acquired from drone 1 via base device 2 is displayed on the screen, and the operator confirms a situation of the observation area.

Figure 2:
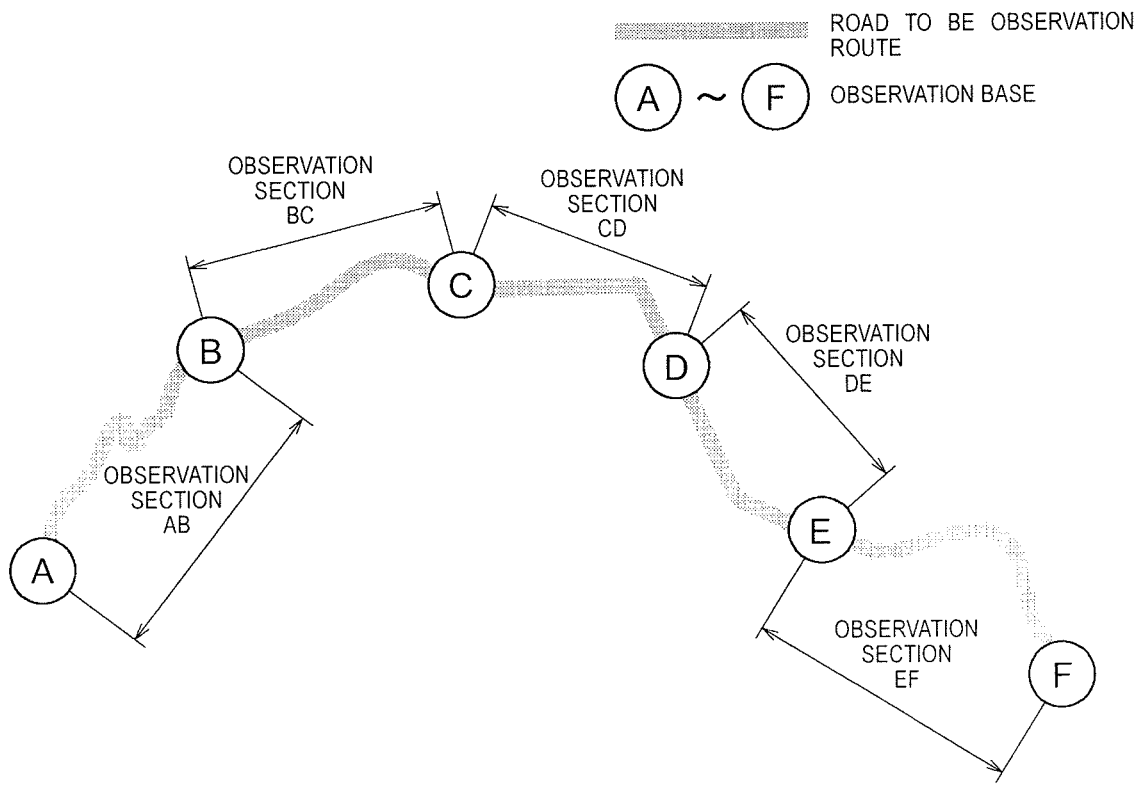
FIG. 2 is an explanatory view illustrating an example of observation routes and observation bases set in an observation area.

Next, the observation route set in the observation area and the observation base will be explained. FIG. 2 is an explanatory view illustrating an example of observation routes and observation bases set in the observation area.

In the example illustrated in FIG. 2, the observation area is a predetermined range of roads, and a plurality of observation bases A to F are installed in the vicinity of the observation route along the road. The observation bases A to F are installed at a distance not exceeding the cruising distance (for example, several km) of drone 1, one drone 1 on standby at the observation base is in charge of observation sections AB, BC, CD, DE, and EF between two observation bases A to F adjacent to each other, and flies and images the observation sections AB, BC, CD, DE, and EF.

For emergencies such as disaster occurrence, it is necessary to acquire observation results of the entire observation area at an early stage. For example, in road inspection at the time of disaster occurrence, it is necessary to grasp the presence or absence of abnormality in all sections of the target road at an early stage (for example, within 3 hours in a case of national highway). Therefore, in a case where the observation area is extremely wide, for example, in a case where the observation area exceeds 100 km, the observation area is divided into a plurality of areas with an appropriate range (for example, several 10 km) and the observation may be performed concurrently in the divided areas by a plurality of drones, respectively.

Figure 3:
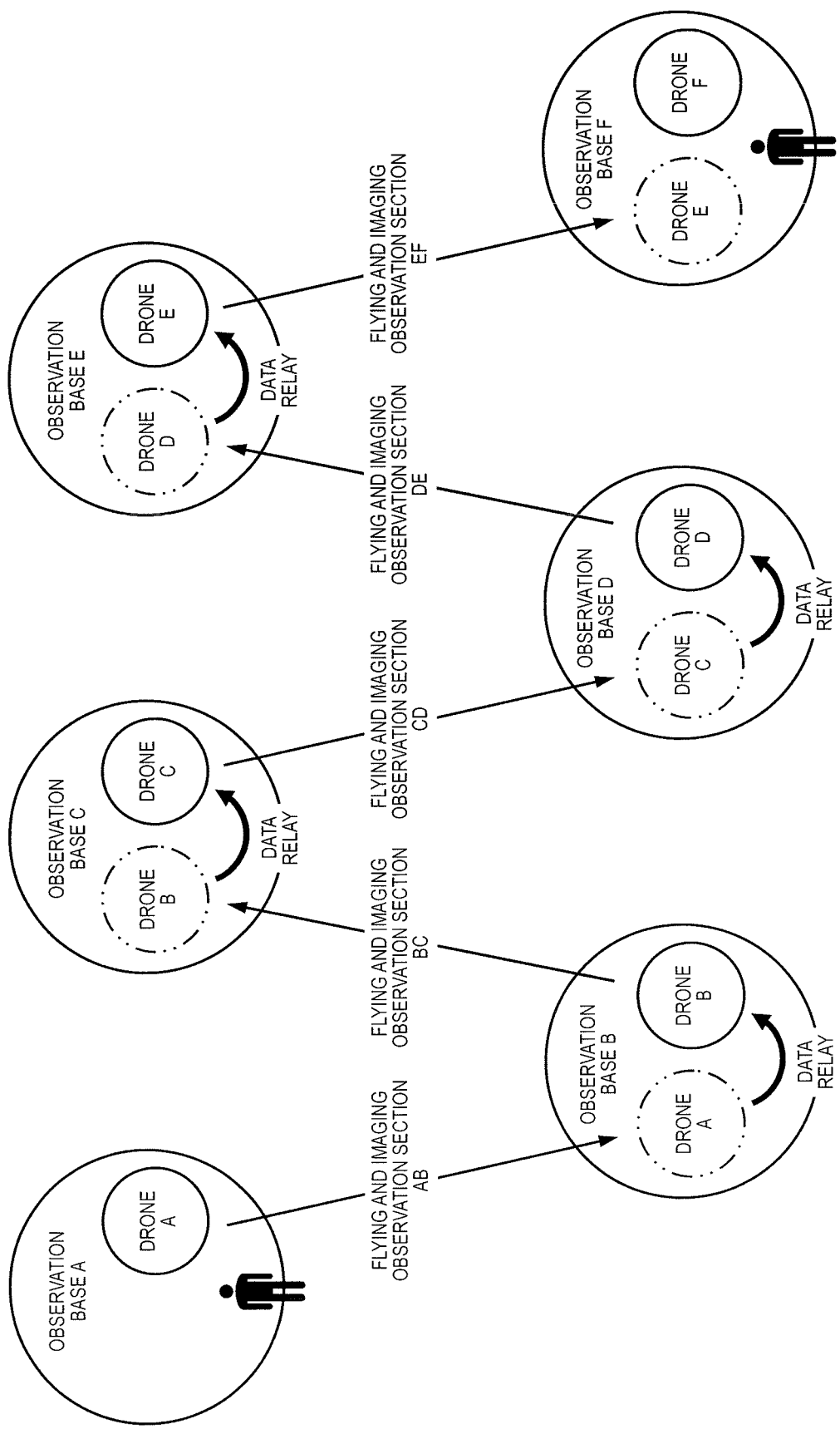
FIG. 3 is an explanatory view illustrating a data relay performed between drones 1.

Next, the data relay performed between drones 1 will be described. FIG. 3 is an explanatory view illustrating a data relay performed between drones 1. In the present embodiment, for the convenience of explanation, drone 1 on standby at observation bases A to F will be described appropriately as drones A to F, respectively. Observation base F which is a final base may not allow the drones F to be on standby.

For emergencies such as a disaster occurrence, an operator staying at observation base A operates PC3 and issues an observation start instruction. In response to this observation start instruction, first drone A which is on standby at observation base A flies and observes observation section AB. When drone A arrives at observation base B, drone B on standby at observation base B flies and observes observation section BC. After that, drones B to E sequentially observe observation sections BC, CD, DE, and EF.

At this time, at observation bases B to E which are relay points, data relays are performed which transmit all observation data stored in their own device since the observation start in drones A to D to the next drones B to E. Therefore, imaged data of all the observation sections AB to EF is stored in the last drone E that arrives at observation base F. Accordingly, the operator staying at observation base F operates PC3 and loads the imaged data stored in drones E into PC3 via base device 2, so that imaged data of all the observation sections AB and EF can be displayed on a screen and the operator can inspect the situation of all the observation areas.

Figure 4:
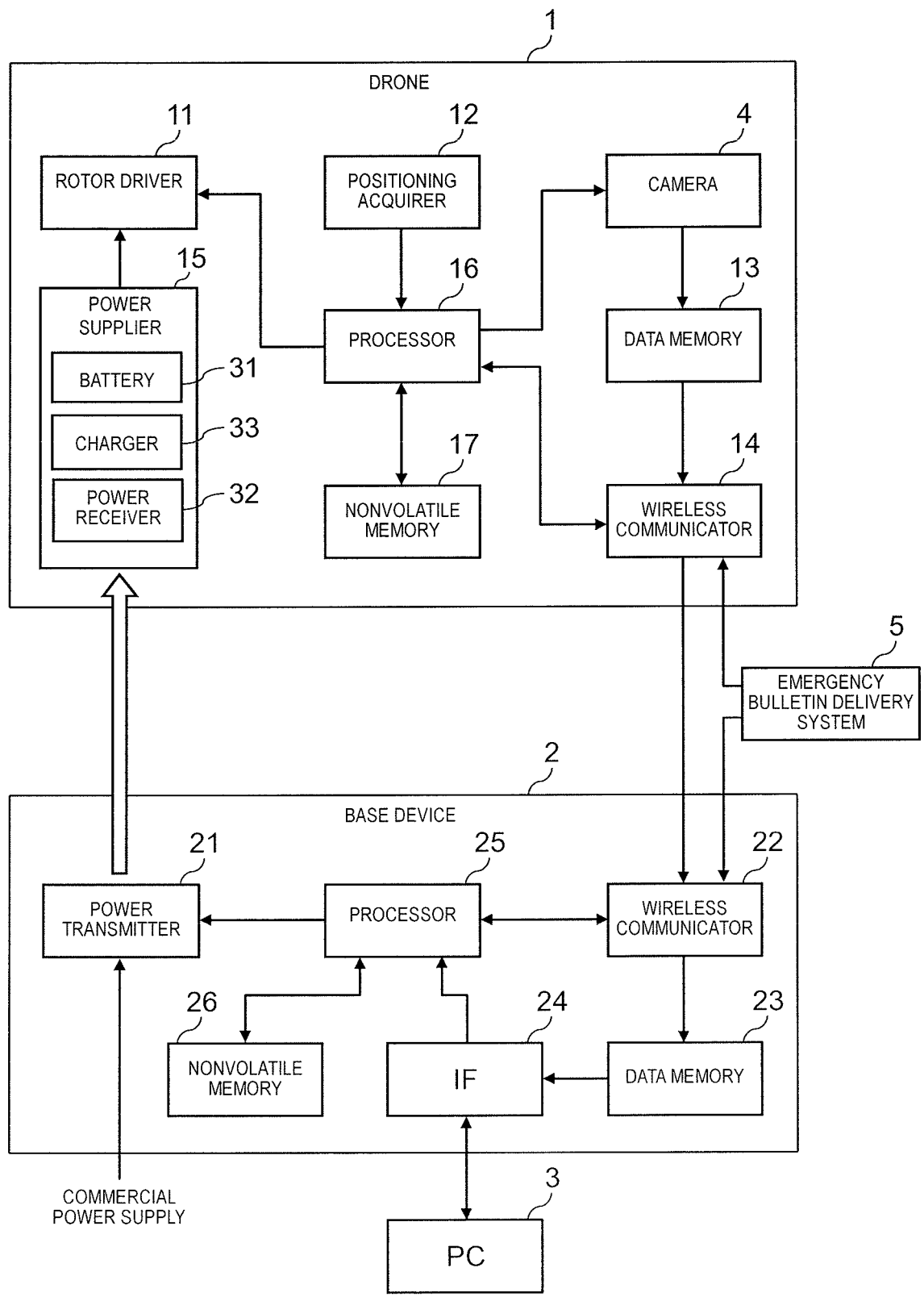
FIG. 4 is a block diagram illustrating a schematic configuration of drone 1 and base device 2.

Next, a schematic configuration of drone 1 and base device 2 will be described. FIG. 4 is a block diagram illustrating a schematic configuration of drone 1 and base device 2.

Drone 1 is a camera-mounted multi-copter and includes rotor driver 11, positioning acquirer 12, camera 4, data memory 13, wireless communicator 14, power supplier 15, processor 16, and nonvolatile memory 17.

Rotor driver 11 includes a motor for driving a rotor (rotary blade), a control circuit for controlling driving of the motor, and the like. The motor is driven by electric power supplied from power supplier 15.

Data memory 13 is for storing imaged data (observation data) by camera 4 and includes a memory card or the like.

Wireless communicator 14 transmits and receives imaged data and controls information with other drones 1 and transmits and receives imaged data and controls information with the base device 2, and includes an antenna and a signal processing circuit for transmitting and receiving a signal with the other drones 1 and the other base device 2. For this wireless communicator 14, it is preferable to use a high-speed short-range wireless communication system such as Wireless Gigabit (WiGig, registered trademark) or IEEE802.11ac (registered trademark) and, according to this, since it is possible to transmit a large amount of imaged data for a short time, it is possible to shorten the observation time of all the observation areas.

Positioning acquirer 12 is for acquiring the position information of drone 1 by a satellite positioning system such as a global positioning system (GPS) and a quasi-zenith satellite system (QZSS) using a quasi-zenith satellite, and includes an antenna which receives the satellite signal, a signal processing circuit, and the like.

Here, although only one of the positioning by GPS and the positioning using quasi-zenith satellite may be used, if the positioning is performed so as to acquire position information based on both positioning results, a positioning accuracy can be improved. In addition, when landing at the observation base, since it is necessary to land near the drone on standby at the observation base and a high accuracy is required for the positioning; the positioning using quasi-zenith satellites may be performed. At this time, it is possible to improve a positioning accuracy by using processing other than satellite positioning and information, such as correction by map matching and a gyro sensor.

Power supplier 15 includes battery 31, power receiver (power reception device) 32 which includes a power reception coil and a control circuit thereof for performing contactless power transmission between base device 2 and power receiver, and charger 33 which charges battery 31 by the contactless power transmission. The charging of battery 31 is performed while the drone is on standby at the observation base.

Here, in positioning using the quasi-zenith satellite, since the precision of about 1 m to 3 m can be easily obtained, although the precision of the landing position is also about 1 m to 3 m, in this case, it is difficult to combine in a cradle equipped with electrodes. Therefore, contactless power transmission is used in this embodiment. In addition, since it is difficult to perform uniform power transmission throughout the landing area, a system that can automatically perform appropriate power transmission by directivity control or the like may be performed.

Nonvolatile memory 17 stores control programs executed by processor 16, control information on flight routes, and the like.

Processor 16 executes the control program read out from nonvolatile memory 17 and thus flight control, imaging control, data relay control and the like are performed.

In the flight control, based on the flight route acquired from nonvolatile memory 17 and the position information acquired from the positioning acquirer, the number of revolutions of the respective rotors or the like is controlled in rotor driver 11 so that drone 1 flies at a required speed and altitude along a predetermined flight route.

In the imaging control, control regarding start and stop of imaging in camera 4, switching of imaging mode (still image or moving image), and the like is performed. In the data relay control, control is performed regarding landing to the observation base, transmission of imaged data with other drones, takeoff from the observation base, and the like.

Base device 2 includes power transmitter (power transmission device) 21, wireless communicator 22, data memory 23, interface (IF) 24, processor 25, and nonvolatile memory 26.

Power transmitter 21 includes a power transmission coil for performing contactless power transmission with drone 1, a control circuit thereof, and the like. Power of the commercial power supply is supplied to power transmitter 21.

Wireless communicator 22 transmits and receives imaged data and control information to and from drones 1, and includes an antenna that transmits and receives signals to/from drones 1, a signal processing circuit, and the like.

Data memory 23 stores imaged data received from drones 1 by wireless communicator 22 and includes a memory card or the like.

Nonvolatile memory 26 stores control programs executed by processor 25, control information on flight routes, and the like.

By executing the control program read from nonvolatile memory 26, processor 25 controls power transmitter 21, wireless communicator 22, drone 1, and the like.

Interface 24 exchanges data with PC3 and, in the present embodiment, via interface 24, the imaged data stored in data memory 23 is transmitted to PC3, and data imaged by PC3 can be displayed on the screen. The memory card constituting data memory 23 may be removed from base device 2 and inserted into the memory slot of PC3.

In addition, in PC3, various settings related to drone 1 can be set and the control information of drone 1 can be appropriately changed via base device 2. At this time, the information input by PC3 is transmitted to drone 1 via interface 24 and wireless communicator 22. In drone 1, the control information of nonvolatile memory 17 is rewritten based on the information received from base device 2.

Accordingly, it is possible to appropriately change the flight route of each drone and the observation base to be the final destination and notify the drones of the presence or absence of the operators staying at the observation base. In this case, for example, at the observation base where the observation is started, the operator operates PC3 to input information on the flight route and the observation base, stores this information as the control information in first drone 1, and the control information and the imaged data are transmitted to the next drone 1 sequentially at the time of data relay. Accordingly, information input by the operator can be notified to all drones 1, and since it is possible to control the flight of each drone 1 so that drone 1 can perform appropriate observation according to the situation, efficient observation can be performed.

In the present embodiment, the observation is started in response to an emergency bulletin of disaster occurrence transmitted from emergency bulletin delivery system 5 such as an earthquake and tsunami warning system (ETWS).

In other words, when the emergency bulletin from emergency bulletin delivery system 5 is received at base device 2, notification of observation start (output of an alert) is performed, and in response to this, when the operator performs an operation of instructing the observation start at base device 2, an observation start instruction is transmitted to drone 1, and in response to this observation start instruction, drone 1 takes off and starts observation.

In addition, when base device 2 receives an emergency bulletin from emergency bulletin delivery system 5, an observation start instruction may be transmitted from base device 2 to drone 1 without going through the operator's operation. In addition, drone 1 itself may receive an emergency bulletin from emergency bulletin delivery system 5 and start observation.

In the present embodiment, although the occurrence of a disaster is detected by an emergency bulletin from emergency bulletin delivery system 5, the earthquake by providing a seismic intensity meter in base device 2 can be detected. In addition, any information that can trigger the observation can be used.

Figure 5:
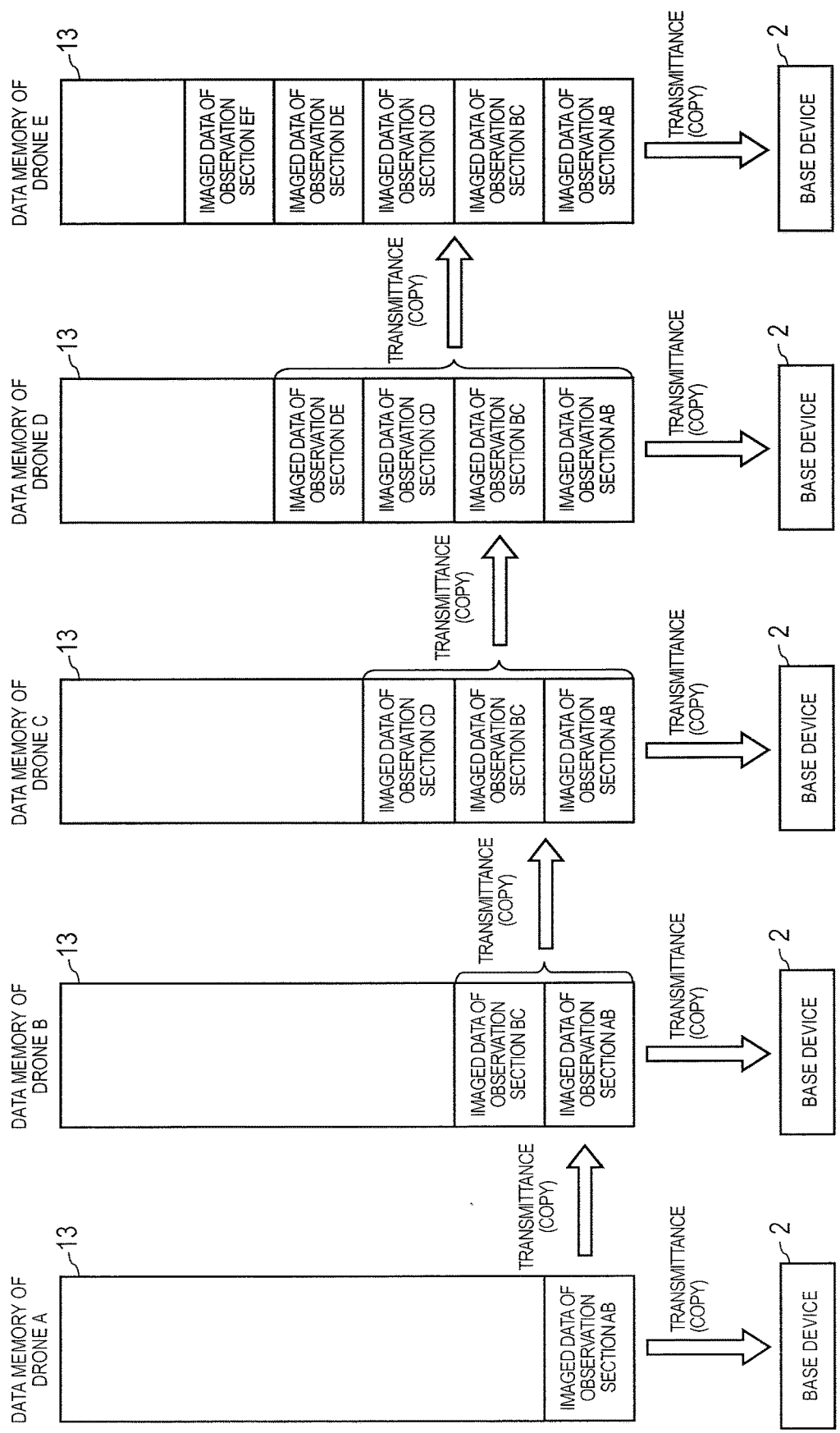
FIG. 5 is an explanatory view illustrating the situation of imaged data stored in data memory 13 of each drone 1.

Next, the situation of imaged data stored in data memory 13 of each drone 1 will be described. FIG. 5 is an explanatory view illustrating a situation of imaged data stored in data memory 13 of each drone 1.

In drone 1, since imaging is performed by camera 4 while flying over the observation section, imaged data is stored in data memory 13. When drone 1 finishes observation of the observation section and arrives at the next observation base, data relay is performed in which the imaged data stored in data memory 13 of drone 1 is transmitted (copied) to drone 1 which is on standby at the next observation base. The data relay between these two drones is repeated each time drone 1 arrives at the next observation base.

At this time, all the imaged data stored in data memory 13 of drone 1 of the relay source since the start of the observation are transmitted to drone 1 of the relay destination. In other words, in addition to the imaged data of the observation section that drone 1 of the relay source itself is in charge of, the imaged data of the observation section that the previous drone 1 is in charge is also transmitted to drone 1 of the relay destination at the same time.

Accordingly, in data memory 13 of the last drone 1 arriving at the observation base as the destination, the imaged data of all the observation sections becomes a state of being stored, and the imaged data of all the observation sections is transmitted to base device 2 and further, transmitted to PC3, and displayed on the screen, so that the operator can inspect the situation of all the observation sections.

In addition, transmission (copy) of the imaged data stored in data memory 13 of drone 1 to base device 2 is also performed at the observation base on the way. Accordingly, it is possible to prevent the disappearance of the imaged data during observation due to the disappearance of drone 1.

As described above, in the present embodiment, it is possible to deliver the observation data of all the observation sections to the observation base as the destination by repeating the data relay between drones 1 sequentially from first drone 1 to the last drone 1.

In this embodiment, even if the observation of all the observation sections is ended, if drone 1 (drone E in a case of FIG. 5) which holds the imaged data of all the observation sections does not arrive at the observation base as the destination, it is necessary to continue the data relay between drones 1 and deliver the imaged data of all the observation sections to the observation base as the destination, and at this time, imaged data of all the observation sections held by drone 1 is transmitted to the next drone as it is.

Figure 6:
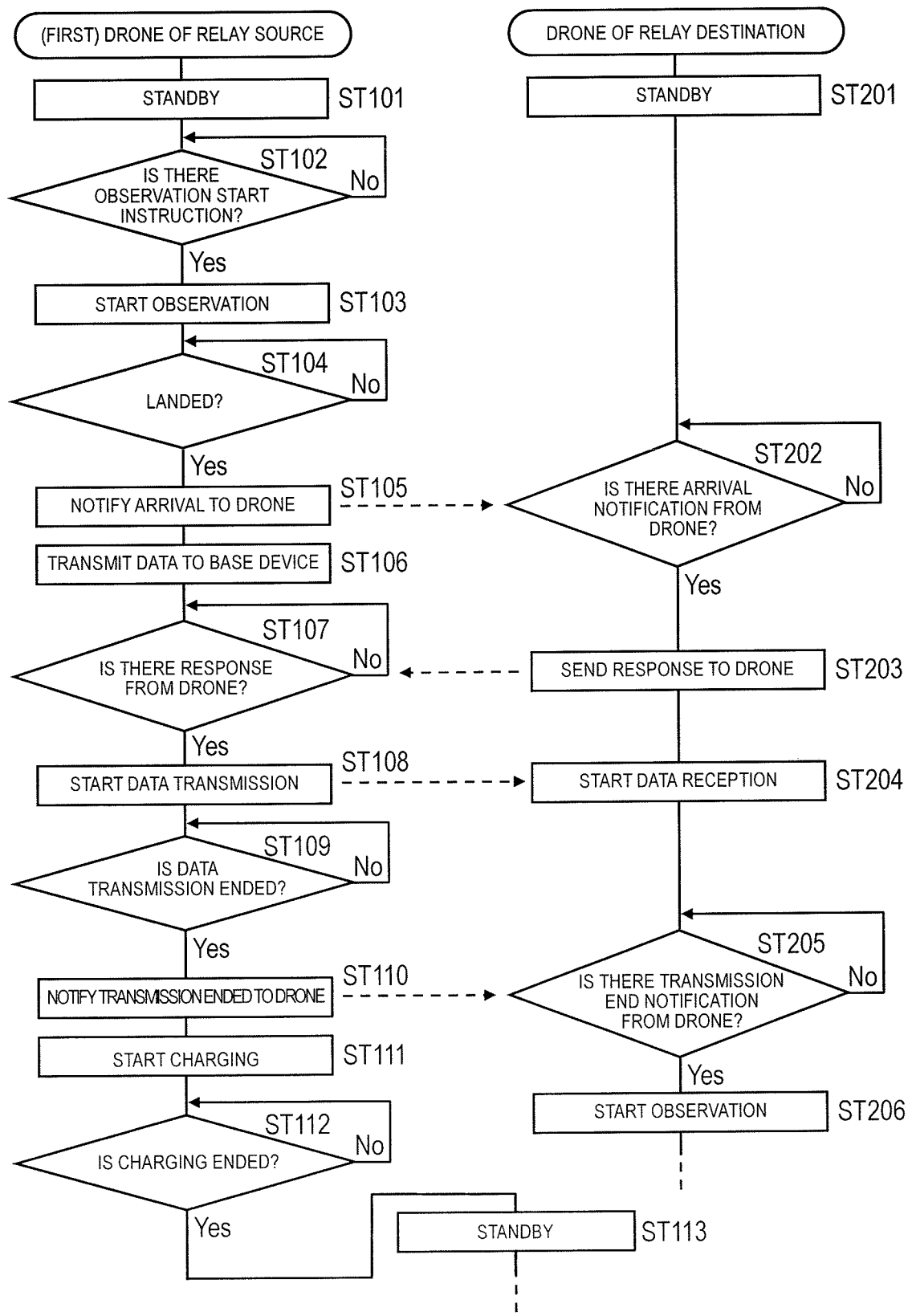
FIG. 6 is a flowchart illustrating an operation procedure during data relay between drones 1.

Next, the operation during data relay between drones 1 will be described. FIG. 6 is a flowchart illustrating an operation procedure at the time of data relay between drones 1.

In first (relay source) drone 1 disposed at the observation base where the observation is started, when the switch thereof is turned on and the drone is activated, the standby state is set (ST101), and when the observation start instruction is received which is received from base device 2 according to performing of an operation to instruct the observation start at base device 2 by the operator (Yes in ST102), the observation is started by taking off from the observation base (ST103).

Next, in drone 1 of the relay source, upon detecting that drone 1 of the relay source has landed at the next observation base based on the position information (Yes in ST104), drone 1 of the relay source transmits the arrival notice to drone 1 of the relay destination (ST105). Then, the imaged data is transmitted to base device 2 (ST106). In addition, upon receiving a response from drone 1 of the relay destination (Yes in ST107), transmission of the imaged data is started (ST108) and when the transmission of the imaged data is ended (Yes in ST109), transmission end notification is transmitted to drone 1 of the relay destination (ST110).

Next, in drone 1 of the relay source, charging is started (ST111), and when the charging is ended (Yes in ST112), the standby state is set (ST113). Accordingly, in drone 1 of the relay source, when the transmission of the imaged data is ended, the charging is immediately started to prepare for the next observation. Therefore, when the next drone 1 arrives, drone 1 can take off immediately after the data relay and start flying.

On the other hand, in drone 1 of the relay destination, when the switch is turned on and the drone is activated, the standby state is set (ST201). Upon receiving the arrival notice from the drone 1 of the relay source (Yes in ST202), the response is transmitted to drone 1 of the relay source (ST203), and reception of the imaged data is started (ST204). Upon receiving the transmission end notification from relay source drone 1 (Yes in ST205), the observation of the next observation section is started by taking off the observation base (ST206).

After that, when drone 1 of the relay destination ends observation of the observation section and lands at the next observation base, data relay is performed with drones 1 of the relay destination as drones 1 of the relay source in the same procedure as above and the data relay between drones 1 is sequentially repeated.

Figure 7:
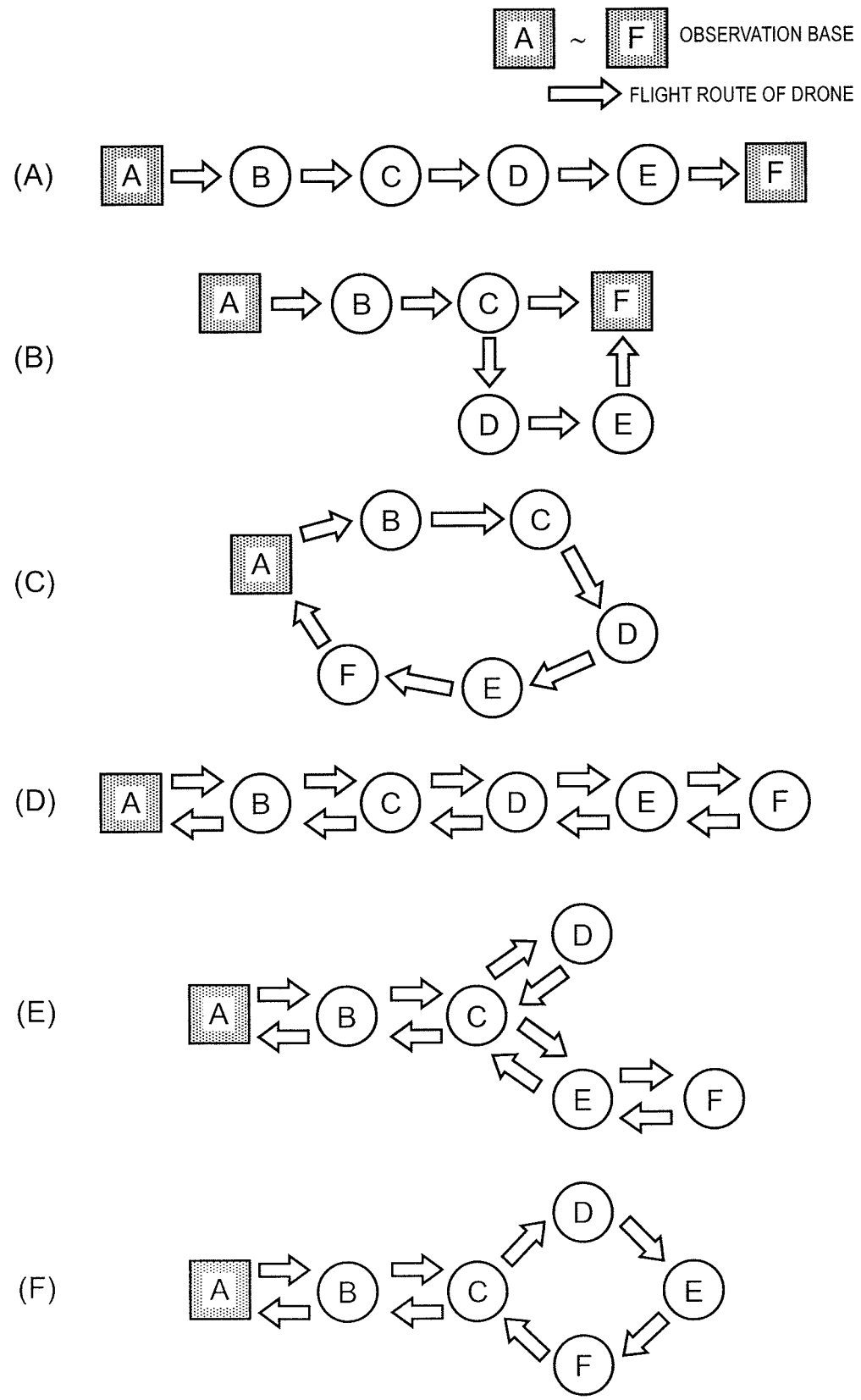
FIG. 7 is an explanatory view illustrating an example of a flight route of drone 1 according to the disposition situation of observation bases.

Next, the flight route of drone 1 according to the disposition situation of the observation base will be explained. FIG. 7 is an explanatory view illustrating an example of a flight route of drone 1 according to the disposition situation of observation bases.

In the present embodiment, each drone 1 on standby at observation bases A to F performs observation by flying over the observation section between observation bases A to F. At this time, observation is started by an operator issuing an observation start instruction at a manned observation base where an operator stays, among observation bases A to F. In addition, since the operator analyzes the imaged data at the manned observation base when the observation of all the observation sections is ended, the flight route of the drone is set so that drone 1 holding the observation data of all the observation sections arrives the manned observation base as the destination.

In the example illustrated in FIG. 7(A), observation bases A and F are manned, the observation is started at observation base A, a data relay is performed in one direction from observation base A to observation base F, the data relay is ended by the last drone 1 arriving at observation base F, and the operator staying at observation base F analyzes the imaged data. In this case, drone 1 may not be on standby at the observation base F.

In the example illustrated in FIG. 7(B), as in the example illustrated in FIG. 7(A), observation bases A and F are manned, the observation is started at observation base A, the observation is ended at observation base F, although an operator staying at observation base F analyzes the imaged data, data relay is performed in parallel through a route from observation base C directly to observation base F and a route from observation base C to observation base F via observation bases D and E sequentially. In this case, it is necessary for observation base C to keep two drones 1 on standby.

In the example illustrated in FIG. 7(C), only observation base A is manned, observation is started from observation base A, and the drone returns from observation base A to observation base A via observation bases B, C, D, E, and F sequentially, that is, the data relay between drones 1 is performed so as to circulate through observation bases A to F, and the data relay is ended by the last drone 1 arriving at observation base A and an operator staying in the observation base A analyzes imaged data.

In the example illustrated in FIG. 7(D), as in the example illustrated in FIG. 7(A), observation is started at observation base A, data relay is performed in one direction from observation base A to observation base F, the observation is ended at observation base F, but only observation base A is a manned person, and it is necessary to deliver imaged data of all the observation sections to observation base A. Therefore, drone 1 that is on standby at observation base F returns back to observation base E, and a data relay that is performed in the opposite direction from observation base F toward observation base A is performed, the data relay is ended by the last drone 1 arriving at observation base A, and then the operator staying at observation base A analyzes the imaged data. Therefore, the data relay between drones 1 becomes a state of reciprocating between observation bases A and F. At this time, observations may be added once again when flying again in the section observed once, or observation may be omitted for the section once observed. The former can improve observation accuracy, while the latter can reduce power consumption, charging time, mounted memory amount, data transmission time, and the like.

In the example illustrated in FIG. 7(E), as in the example illustrated in FIG. 7(D), only observation base A is manned, observation at observation base A is started, the last drone 1 arrives at observation base A, and the operator staying at observation base A analyzes the imaged data, but the data relay between drones 1 becomes a state of reciprocating between observation bases C and D and between observation bases C, E, and F.

In the example illustrated in FIG. 7(F), as in the example illustrated in FIG. 7(E), only observation base A is manned, observation is started at observation base A, the last drone 1 arrives at observation base A, and the operator staying at observation base A analyzes the imaged data, but the drone returns from observation base C to observation base C via observation bases D. E, and F, that is, the data relay between the drones is performed so as to circulate observation bases C, D, E, and F.

Figure 8:
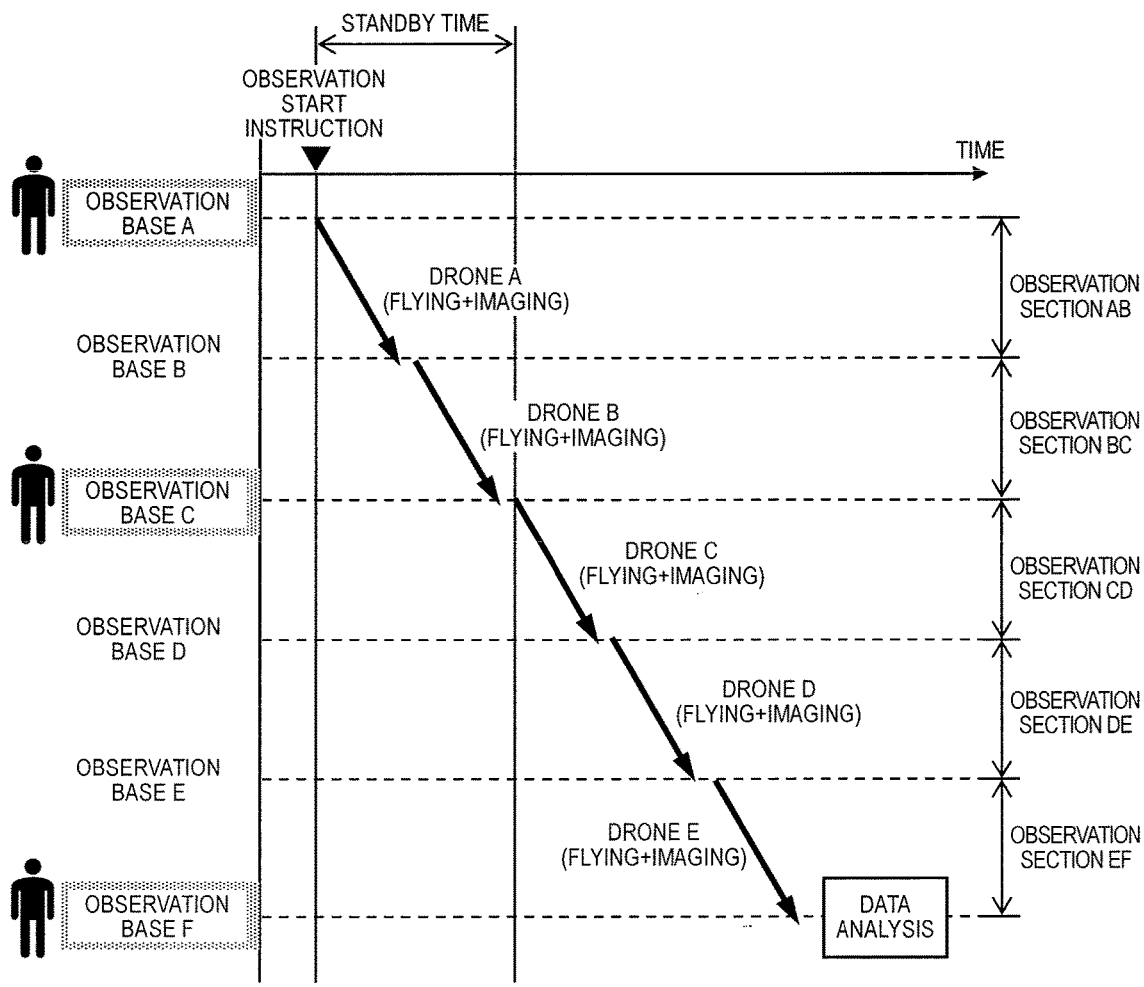
FIG. 8 is an explanatory view illustrating an example of a flight situation of drone 1 in a case where an operator is not absent at all observation bases where the operator normally stays.
Figure 9:
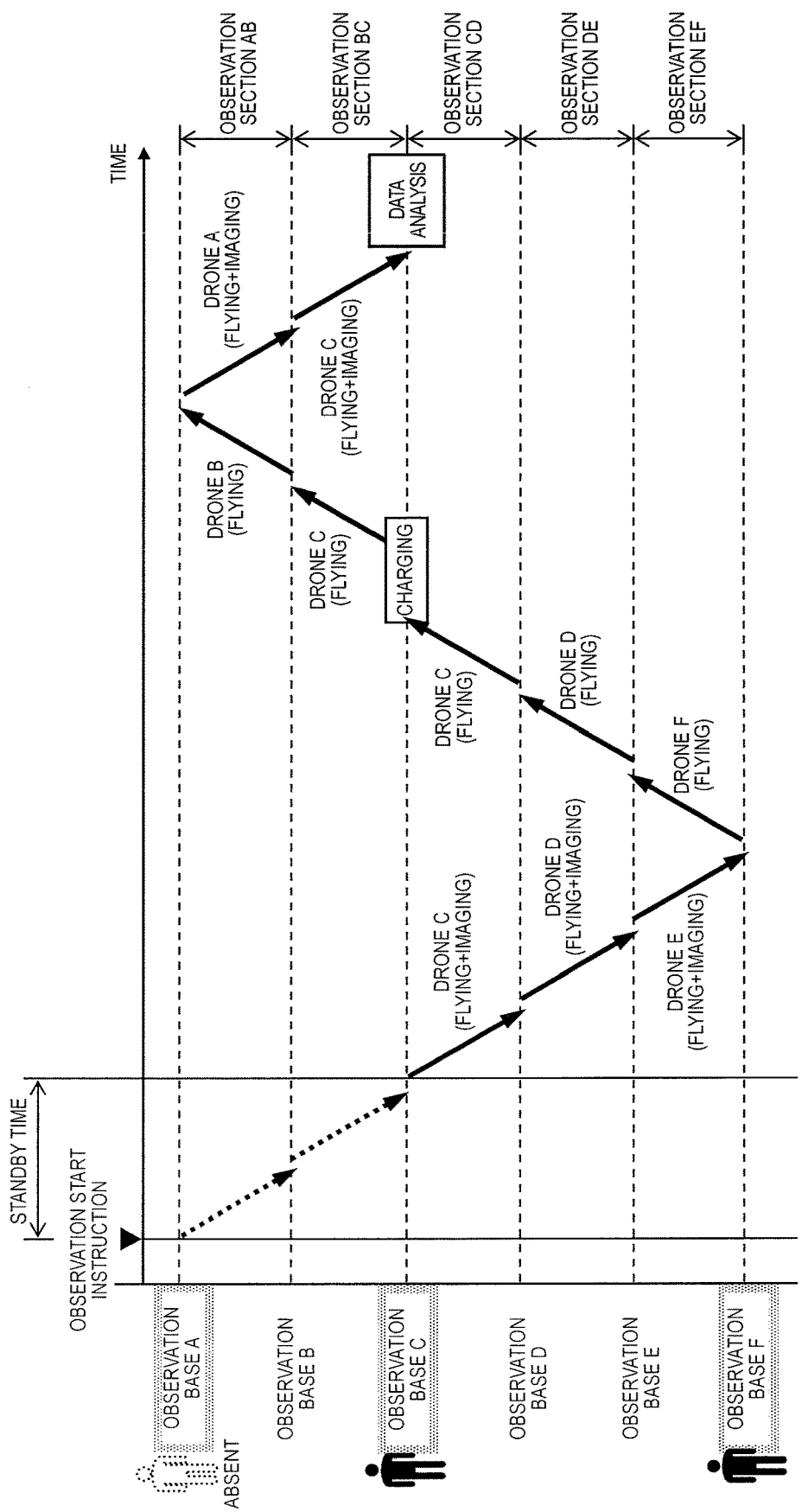
FIG. 9 is an explanatory view illustrating an example of a flight situation of drone 1 in a case where an operator is absent at any of the observation bases where the operator normally stays.
Figure 10:
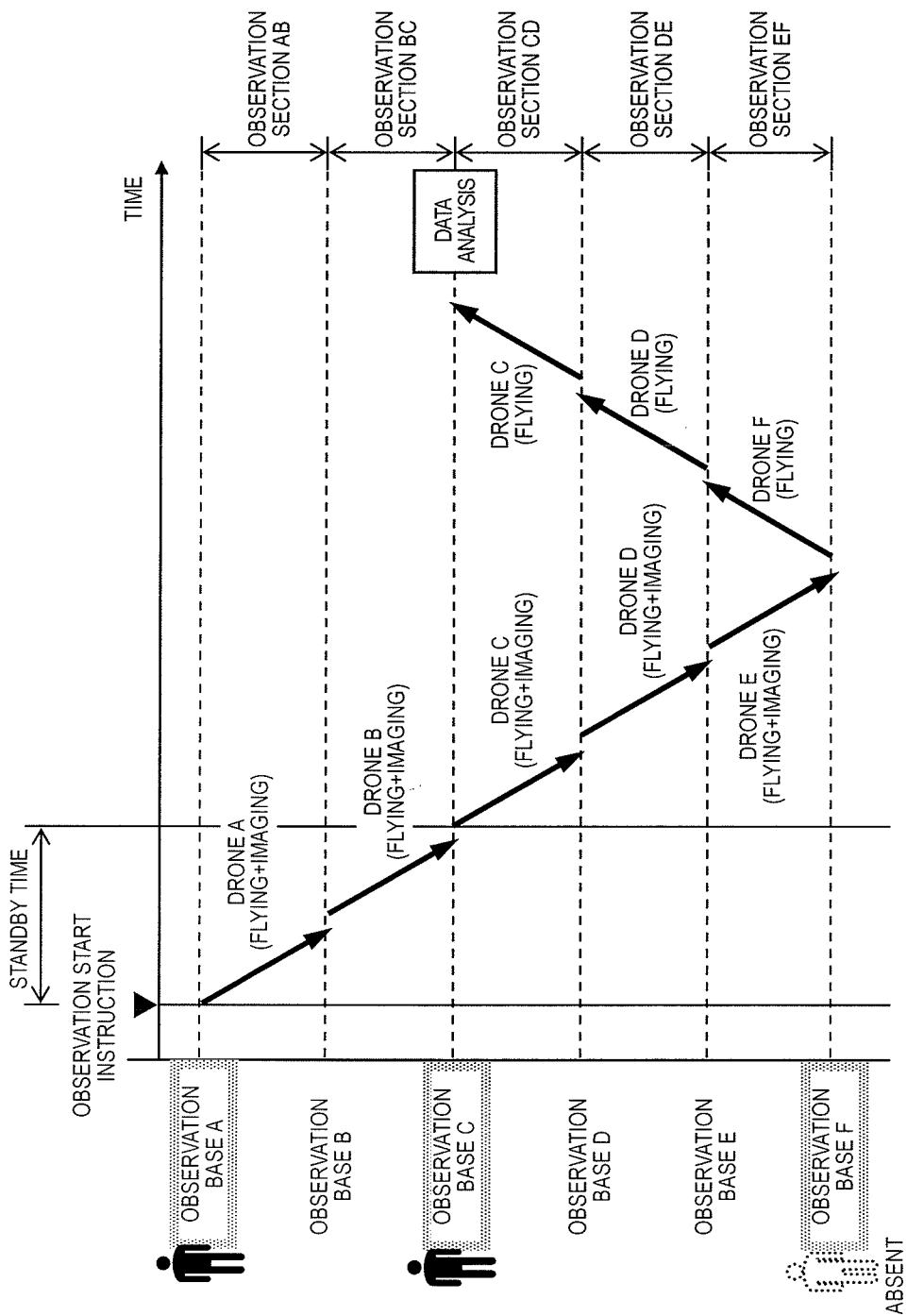
FIG. 10 is an explanatory view illustrating an example of a flight situation of drone 1 in a case where an operator is absent at any of the observation bases where the operator normally stays.
Figure 11:
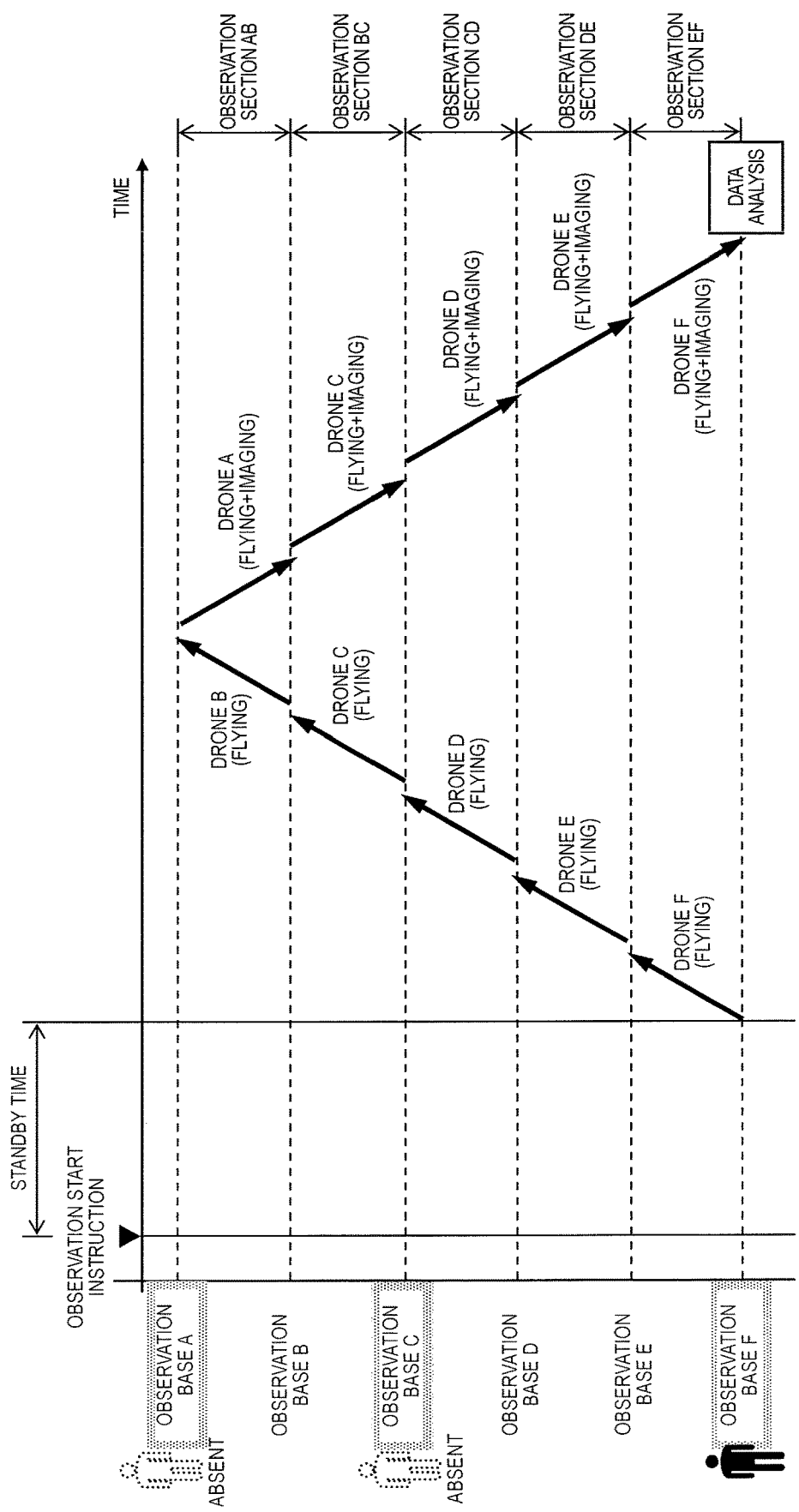
FIG. 11 is an explanatory view illustrating an example of a flight situation of drone 1 in a case where an operator is absent at any of the observation bases where the operator normally stays.

Next, the flight situation of drone 1 in a case where an operator is absent at an observation base where an operator normally stays will be described. FIG. 8 is an explanatory view illustrating an example of the flight situation of drone 1 in a case where the operator is not absent at all of the observation bases where the operator normally stays. FIG. 9, FIG. 10, and FIG. 11 are explanatory views illustrating an example of flight situation of drone 1 in a case where an operator is absent at any of the observation bases where the operators normally stay.

In the example illustrated in FIG. 8, observation bases A, C, and F are manned observation bases that the operator normally stay, and by an operator staying at observation base A receiving an emergency bulletin of a disaster occurrence and issuing an observation start instruction, observation is started from observation base A, and the drones A to E on standby at observation bases A to E sequentially observe observation sections AB to EF. Then, when a drone E that has imaged data of all the observation sections AB to EF arrives at observation base F by the data relay between drones A to E, the data relay is ended here and an operator that stays in observation base F analyzes imaged data.

Here, since a failure occurs in the traffic infrastructure such as a road or a railroad and the operator cannot go to observation base A, if the operator is absent at observation base A, the operator cannot issue an observation start instruction at observation base A. In addition, for the same reason, if the operator is absent at observation base F, the operator cannot analyze the imaged data at observation base F.

Therefore, in the present embodiment, in a case where the operator is absent at observation base scheduled to start the observation, observation base at which the observation is started is changed so that the observation is started at another observation base where the operator stays.

Here, if a failure occurs in the communication infrastructure, it cannot be determined whether or not the operator is staying at observation base. Therefore, in the present embodiment, at the observation base at which the operator stays, at the scheduled timing based on the predetermined observation start timing such as reception of an emergency bulletin of a disaster occurrence, in a case where drone 1 of the relay source does not arrive, the data relay is given up and observation is started from the observation base. In other words, drone 1 on standby at the observation base is immediately launched without being on standby for the arrival of drone 1 of the relay source.

At this time, after first drone 1 on standby at observation base scheduled to start the observation is launched normally, a time obtained by adding a predetermined margin (for example, 1 minute) to the required time required for drone 1 to arrive at the target observation base is set as a standby time, this standby time is set for each observation base, and in a case where drone 1 of the relay source does not arrive at observation base even after the standby time, drone 1 on standby at the observation base is immediately launched.

In addition, in a case where an operator is absent at observation base scheduled to analyze the imaged data, observation base serving as the destination to which the imaged data of all the observation sections are delivered is changed, and a drone holding imaged data of all the observation sections is made to arrive at another observation base where an operator is staying.

In other words, when a drone holding imaged data of all the observation sections arrives at an observation base scheduled to analyze the imaged data, in a case where an operator is staying at observation base, the data relay is ended at the observation base. On the other hand, in a case where the operator is absent at observation base, the observation base as the destination to which the imaged data of all the observation sections is delivered is changed to another manned observation base and the data relay is continued. Drone 1 may acquire information on whether observation base is manned or unmanned from base device 2 of the observation base at which drone 1 arrives.

In the example illustrated in FIG. 9, there is a case where an operator is absent at observation base A and an operator cannot issue an observation start instruction at observation base A. In this case, since the drone B does not arrive at observation base C even after the standby time from the predetermined observation start timing such as the reception of the emergency bulletin of the disaster occurrence, the operator at observation base C immediately launches drone C from observation base C.

When drone C is immediately launched from observation base C, drone C, drone D, and drone E sequentially observe the observation sections CD, DE, and EF, and drone E arrives at the last observation base F. At this time, although drone E holds the imaged data of the observation sections CD, DE, and EF, by performing data relay in the order of drone C, drone D, and drone E, since drone C is immediately launched at observation base C, drone E does not hold imaged data of the observation sections AB and BC.

Therefore, observation is performed at observation sections AB and BC by returning at observation base F. At this time, after data relay for transmitting the imaged data of the drone E to the drone F on standby at observation base F is performed, the drone B which holds the imaged data of the observation sections CD, DE, and EF arrives at observation base A by performing data relay in order of drone F, drone D, drone C, drone B from observation base F to observation base A.

Then, after data relay for transmitting the imaged data of the drone B to the drone A which is on standby at observation base A is performed, data relay is performed in order of the drone A and the drone C from observation base A to observation base C, and at this time, drone A and drone C sequentially observe the observation sections AB and BC. Accordingly, it is possible that drone C holding the imaged data of all the observation sections AB to EF arrives at observation base C and the operator performs the analysis operation of the imaged data of all the observation sections AB to EF at observation base C.

Here, in a case where the operator cannot issue the observation start instruction because the operator is absent at observation base A, when drone C flies from observation base D to observation base C, because there is no drone on standby inside observation base C, drone C continues to fly to observation base B after drone C that flies from observation base D is charged at observation base C.

Although the operator is issued an observation start instruction to drone A at observation base A, for example, since drone B is arrived at observation base C with a delay, in a case where drone C is immediately launched at observation base C, since drone B is on standby at observation base C and drone A is on standby at observation base B, this drone B, and drone A may fly to the next observation base in order. However, in a case where drone B arrives at observation base C with a delay after drone C is immediately launched, since the imaged data of the observation sections AB and BC are delivered at observation base C, when the flight returns, the observation data of all the sections are collected at a step of drone C being arrived at observation base C from observation base D, the observation may be ended at observation base C. In this case, analysis can be started as soon as observation is ended at observation base C.

In addition, in a case where drone A or drone B disappears due to an accident or the like since there is no drone on standby at observation base A or observation base B, after the drone is charged which flies to observation base, the drone may fly to the next observation base.

In addition, in the drone C that arrives at observation base C as the destination, although the order of the imaged data for each observation section stored in data memory 13 is in a state of being different from the order of the actual observation section, since the position information is added to the imaged data, even, if the order of the imaged data is changed, it is possible to identify in which observation section the imaged data is taken.

Each drone stores not only the observation section initially set but also all the observation sections, and when data relay to the next drone is performed, the observed observation section up to that point is also transmitted together. Alternatively, each drone can recognize the observed observation section from the information of the imaged data stored in the data memory. Accordingly, each drone can know which observation section is not yet observed and can fly by recognizing the observation section thereof based thereon.

Next, an example illustrated in FIG. 10 will be described. In this example, there is a case where the operator is absent at observation base F and thus the operator cannot analyze the imaged data at observation base F. In this case, when the drone E holding the imaged data of all the observation sections AB to EF arrives at observation base F, next drone 1 returns to observation base F, and the data relay in order of drone F, drone D, and drone C is performed, and thus drone C holding imaged data of all the observation sections AB to EF arrives at observation base C, and here, the operator can perform an analysis operation of the imaged data of all the observation sections AB to EF.

Next, an example illustrated in FIG. 11 will be described. In this example, since the operator is absent at observation bases A and C, the operator cannot issue an observation start instruction at observation base A, and furthermore, there is a case where the drone cannot be immediately launched at observation base C. In this case, since drone E does not arrive at observation base F even after the standby time from the predetermined observation start timing, such as reception of an emergency bulletin of disaster occurrence, drone F is immediately launched from observation base F.

When drone F is immediately launched from observation base F, drone F, drone E, drone D, the drone C, and drone B are made to fly in order from observation base F to observation base A. When drone B arrives at observation base A, the drone returns to observation base A and causes drone A, drone C, drone D, drone E, and drone F to fly in order, and at this time, since observation of observation sections AB to EF is not performed, by performing data relays in the order of drone A, drone C, drone D, drone E, and drone F, drone F holding imaged data of all the observation sections AB to EF arrives at observation base F. Accordingly, at observation base F, the operator can perform the analysis operation of the imaged data of all the observation sections AB to EF.

In the example illustrated in FIG. 11, although the observation is performed at a return path from observation base A to observation base F, the observation may be performed at an outbound path from observation base F to observation base A. Alternatively, observations may be made both on the outbound path and on the return path. In this case, observation accuracy can be improved.

As described above, in the present embodiment, drone 1 is set to take off at the observation base where drone 1 is on standby, in a case where the previous drone 1 does not arrive at the scheduled timing, so that drone 1 is immediately launched from the observation base, whereby since the operator cannot go to the observation base due to the failure of the traffic infrastructure, even in a case where the operator cannot issue the observation start instruction, the observation can be started at an early stage.

In addition, in the present embodiment, when drone 1 arrives at observation base located at the end of the observation area, even in a case where the observation of all the observation sections is not ended, the drone returns to the observation base and performs observation of the observation sections that are missing in the observation data, and according to this, observation data of all the observation sections can be reliably delivered to a manned observation base and it is possible for the operator to analyze all the observation areas.

In addition, in the present embodiment, when a drone arrives at an observation base located at the end of the observation area, in a case where observation base is unmanned, the drone returns to the observation area and data relay is performed toward the manned observation base, and thereby, observation data of all the observation sections can be certainly delivered to a manned observation base and an operator can analyze the entire observation area.

In addition, in the present embodiment, the data relay is ended when drone 1 arrives at a manned observation base in a state where observation data of all the observation sections are stored in data memory 13 and thereby it is possible to avoid drone 1 from performing wasteful flight.

In addition, in the present embodiment, in a case where drone 1 arrives at observation base and drone 1 on standby at observation base does not exist and it is necessary to fly to the next observation base, after the charge is performed, the drone is going to fly to the next observation base and thereby, it is possible to reliably deliver the observation data of all the observation sections to the manned observation base and the operator can analyze all the observation areas.

In such data relay control, although information on the presence or absence of the operator staying at observation base is required, for this information, it is only necessary for the operator to operate the base device 2 or the like to hold that the base device 2 is manned. Further, in addition to the execution by processor 16 of drone 1 itself, the data relay control may be executed by processor 25 of base device 2.

In this embodiment, as illustrated in FIG. 7 to FIG. 11, although the observation is started at the manned observation base where the operator stays, observation may be started at the unmanned observation base where the operator does not stay. In this case, when the emergency bulletin of the disaster occurrence is received at base device 2 or drone 1, drone 1 is automatically taken off and observation is started.

In addition, in this embodiment, as illustrated in FIG. 9 and FIG. 11, although the drone is immediately launched at the manned observation base at which the operator stays, the drone may be immediately launched at the unmanned observation base.

Figure 12:
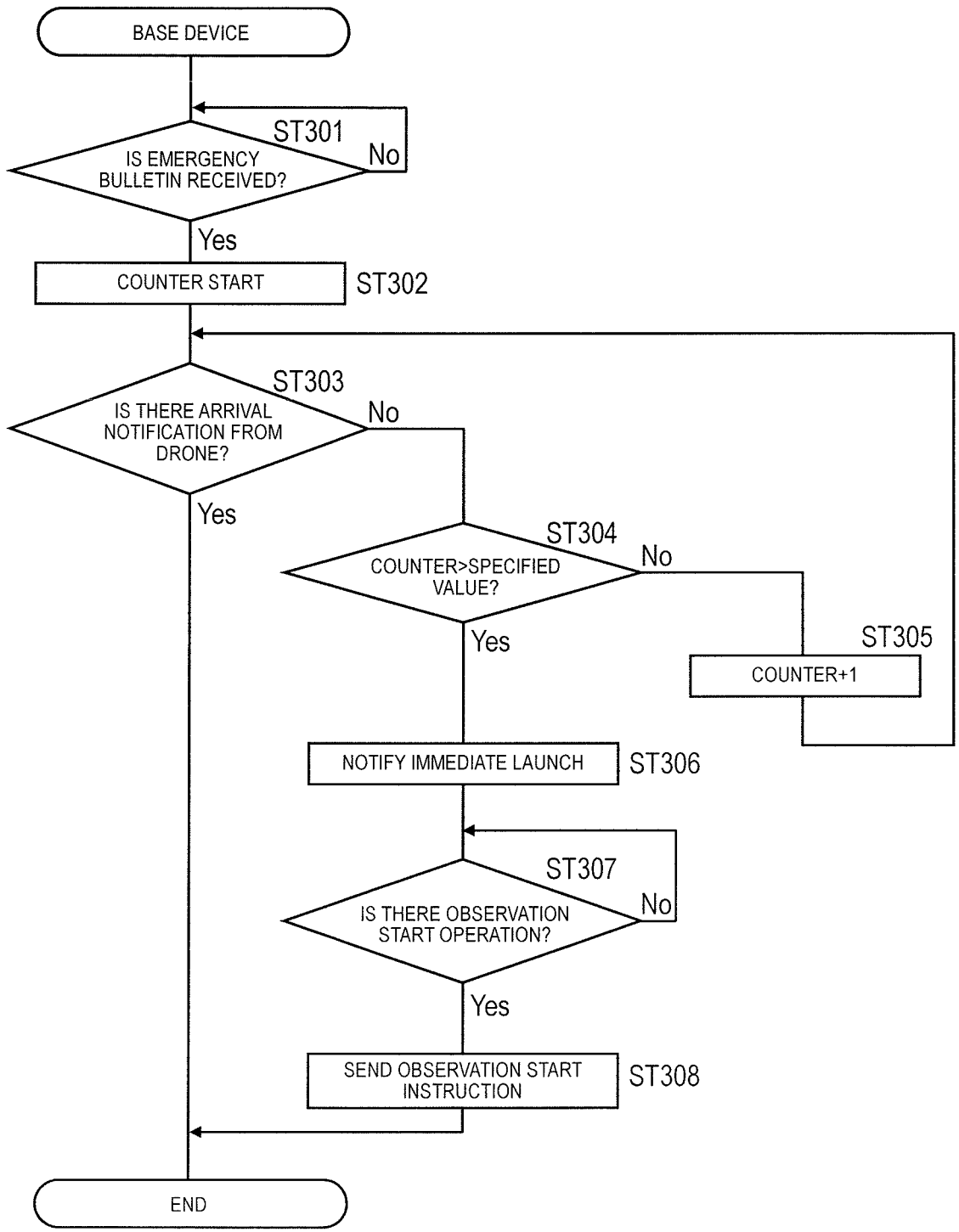
FIG. 12 is a flowchart illustrating an operation procedure when drone 1 is immediately launched.

Next, a case where the base device 2 informs the immediate launch will be described. FIG. 12 is a flowchart illustrating an operation procedure when drone 1 is immediately launched.

In the example illustrated in FIG. 12, in a case where drone 1 of the relay source does not arrive even after a predetermined standby time elapses after the emergency bulletin of the disaster occurrence is received at base device 2, a notice of immediate launch (alert output) is performed and, in response to the notice of immediate launch, when the operator performs an operation of observation start instruction, an observation start instruction is sent to drone 1.

Specifically, when the emergency bulletin of disaster occurrence is received (Yes in ST301), an elapsed time counter is started (ST302).

Then, in a case where there is no arrival notification from drone 1 of relay source (No in ST303) and the count value does not exceed the predetermined threshold value, that is, in a case where the standby time does not lapse (in ST304 No), the count value is incremented by 1 (ST305) and the process returns to ST301.

In addition, in a case where the count value exceeds the predetermined threshold without arrival notification from drone 1 of relay source (No in ST303), that is, if the standby time elapses (Yes in ST304), the notice that the drone. 1 of the relay destination is to be immediately launched is given (ST306). Then, in response to the notification, when the operator performs an operation to instruct the start of observation (Yes in ST307), base device 2 transmits an observation start instruction to drone 1 (ST308).

In addition, in a case where an arrival notification from drone 1 of relay source is received (Yes in ST303) before the count value exceeds the predetermined threshold (No in ST304) although the emergency bulletin of the disaster occurrence is received (Yes in ST301), no special operation is performed as base device 2.

In the example illustrated in FIG. 12, in a case where the operator performs an operation instructing the start of observation, although the observation start instruction is transmitted from base device 2 to drone 1, it is not necessary to perform the operation by the operator (ST307 is omitted), the observation start instruction may be transmitted from base device 2 to drone 1.

Figure 13:
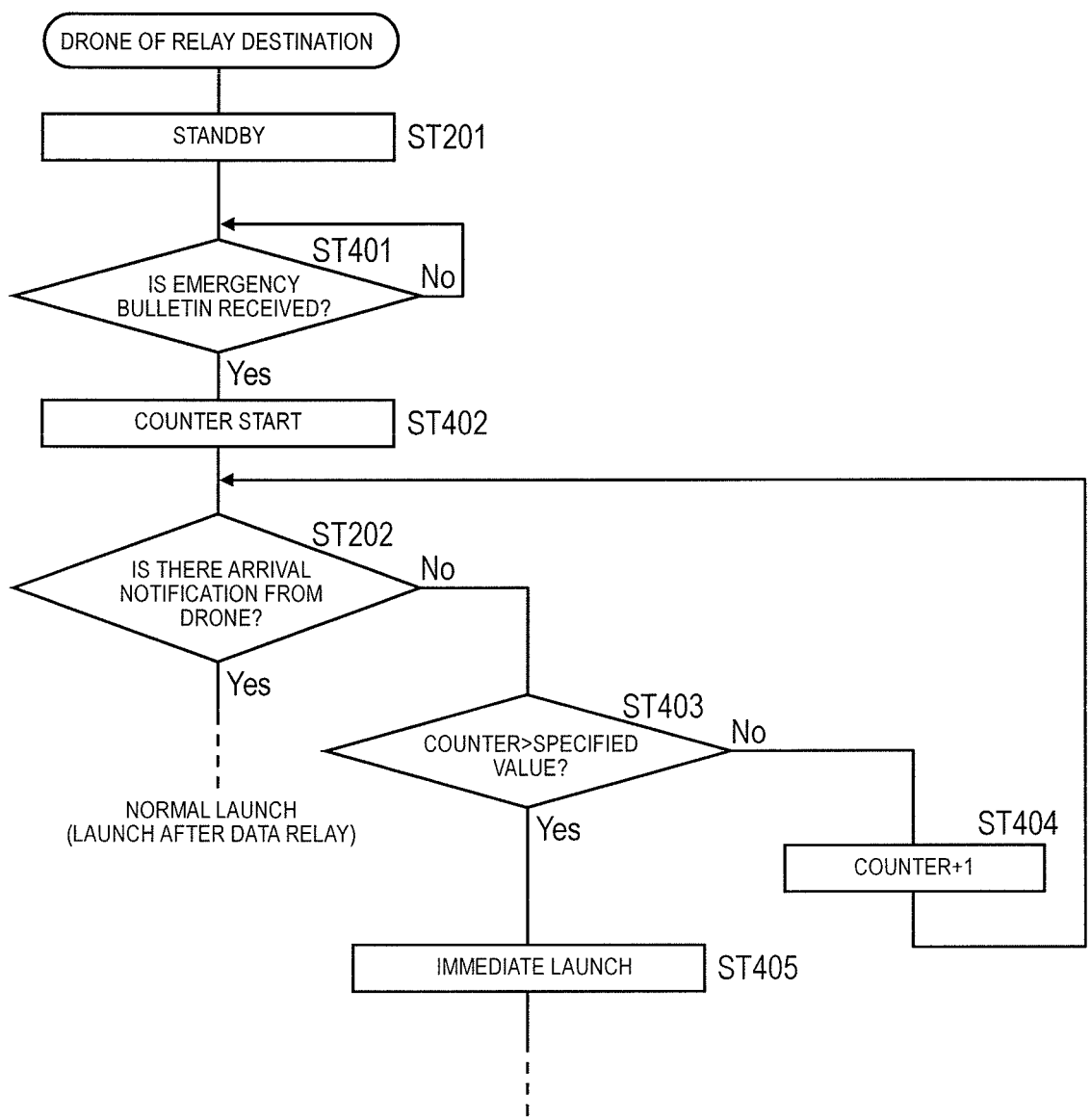
FIG. 13 is a flowchart illustrating an operation procedure when drone 1 is immediately launched.

Next, a case where the immediate launch is performed not by the observation start instruction from the base device 2 but by the determination of drone 1 itself will be described. FIG. 13 is a flowchart illustrating an operation procedure when drone 1 is immediately launched.

In the example illustrated in FIG. 13, in drone 1 on standby at observation base, even if a predetermined standby time elapses after an emergency bulletin on the disaster occurrence is received, if drone 1 of the relay source does not arrive, the drone will be immediately launched. Others are the same as the example illustrated in FIG. 6.

Here, the procedure of determining the immediate launch is the same as the example illustrated in FIG. 12, and after the emergency bulletin of the disaster occurrence is received (Yes in ST401), in a case where the standby time lapses (Yes in ST403) although there is no arrival notification from the drone 1 of the relay source (No in ST202), drone 1 is immediately launched (ST405).

In addition, in a case where an arrival notification from drone 1 of relay source is received (Yes in ST202) although the emergency bulletin of the disaster occurrence is received (Yes in ST401) before the standby time passes (No in ST403), drone 1 is normally launched. In other words, the operation proceeds to ST203 and the subsequent steps illustrated in FIG. 6 and after the transmission of the imaged data, the drone is taken off and the observation is started.

As described above, the embodiment is described as an example of the technique disclosed in the present application. However, the technology in the present disclosure is not limited to this and can also be applied to embodiments in which change, replacement, addition, omission, and the like are performed. In addition, it is also possible to combine each component described in the above embodiment to provide a new embodiment.

For example, in the embodiment described above, although the flying object is described as a drone (multicopter), other flying objects such as a helicopter and an airplane may be used.

In addition, in the embodiment described above, although the use for observing the situation of the road at the time of disaster occurrence is described, the observation system may be used for other purposes.

In addition, in the embodiment described above, although the observer mounted on the flying object is the camera for imaging the observation area, the observer is not limited to the camera and the observer can be similarly applied to other observation devices.

INDUSTRIAL APPLICABILITY

The observation system and the observation method using the flying object according to the present disclosure can observe the observation area that is wider than the cruising distance of the flying object, and furthermore, even in a case where the operator cannot go to the observation base due to a failure of the traffic infrastructure and even in a case where a failure occurs in the communication infrastructure, it is possible for an operator to acquire the observation data of all the observation sections and analyze all the observation areas, and it is useful as an observation system, an observation method, or the like which causes a flying object to autonomously fly along the observation route preset on the observation area and observing the situation of the observation area.

REFERENCE MARKS IN THE DRAWINGS

1 DRONE (FLYING OBJECT)
2 BASE DEVICE
3 PC
4 CAMERA (OBSERVER)
5 EMERGENCY BULLETIN DELIVERY SYSTEM
11 ROTOR DRIVER
12 POSITIONING ACQUIRER
13 DATA MEMORY (STORAGE)
14 WIRELESS COMMUNICATOR (COMMUNICATOR)
15 POWER SUPPLIER
16 PROCESSOR
17 NONVOLATILE MEMORY
21 POWER TRANSMITTER (POWER TRANSMISSION DEVICE)
22 WIRELESS COMMUNICATOR
23 DATA MEMORY
24 IF (INTERFACE)
25 PROCESSOR
26 NONVOLATILE MEMORY
31 BATTERY
32 POWER RECEIVER (POWER RECEPTION DEVICE)
33 CHARGER

The invention claimed is:

1. An observation system which causes a flying object to autonomously fly along an observation route preset on an observation area to observe the situation of the observation area, the observation system comprising:

a plurality of flying objects that respectively are on standby at a plurality of observation bases which are disposed at a distance with respect to each other which does not exceed a cruising distance of the flying object and each of the plurality of flying objects has an observer that observes the situation of the observation area, has a storage which stores observation data by the observer, and has a communicator that transmits the observation data to another flying object, each flying object being on standby at least one of before and after flying between observation bases, wherein when a first flying object flies through an observation section of the observation area from a first observation base at which the first flying object was on standby to a second observation base to perform observation and when the first flying object lands at the second observation base, the first flying object performs data relay for transmitting the observation data regarding a first observation section which is stored in the storage of the first flying object to a second flying object on standby at the second observation base, and when the transmission of the observation data is completed, the second flying object takes off and starts observation of a next observation section of the observation area, stores the observation data regarding the next observation section in the storage with the observation data of the first observation section and the first flying object enters a standby condition at the second observation base.

2. The observation system of claim 1, wherein the observer is a camera that images the observation area, and the observation data is imaged data output from the camera.

3. The observation system of claim 1, further comprising: a power transmitter installed in each of the plurality of observation bases and supplies power for charging to the flying object on standby by contactless power transmission.

4. The observation system of claim 1, wherein the communicator transmits the observation data to the next flying object by wireless communication.

5. The observation system of claim 1, wherein, when the previous flying object does not arrive at one of the observation bases on which the flying object is on standby at a scheduled timing, the flying object is immediately launched without waiting for the arrival of the previous flying object.

6. The observation system of claim 1, wherein, when the flying object arrives at one of the observation bases located at an end of the observation area, and when observation of all the observation sections is not ended, the plurality of flying objects return to each of the observation bases and perform observation of the observation section where the observation data is absent.

7. The observation system of claim 1, wherein, when the flying object arrives at one of the observation bases located at an end of the observation area, and when one of the observation bases is unmanned, the plurality of flying objects return to each of the observation bases and continue to perform the data relay towards a manned observation base of the observation bases.

8. The observation system of claim 1, wherein, when the observation data of all the observation sections is stored in the storage, and when the flying object arrives at a manned observation base of the observation bases, the flying object ends the performance of the data relay.

9. The observation system of claim 1, wherein, when the flying object arrives at one of the observation bases, when there is no flying object on standby at the one of the observation bases and there is a need to fly the flying object toward a next observation base of the observation bases, the flying object flies to the next observation base of the plurality of observation bases after charging.

10. An observation method which causes a flying object to autonomously fly along an observation route preset on an observation area to observe the situation of the observation area, the method comprising:

flying the flying object through an observation section from an observation base on which the flying object is on standby, to a next observation base, to perform observation, each flying object being on standby at least one of before and after flying between observation bases, and performing data relay for transmitting the observation data of the observation section which is stored in the flying object, to the next flying object on standby at the next observation base when the flying object lands at the next observation base;

flying the next flying object, upon completion of the data relay, to a further observation base; and delivering the observation data of all the observation sections to a final destination observation base by sequentially repeating the performance of the data relay between the flying objects in each of the observation sections.

11. The observation method according to claim 10, wherein the data relay is performed while a transmitting flying object and a receiving flying object are both at an observation base.

12. The observation method according to claim 10, wherein the data relay transmits all of the observation data to the next flying object on standby.

13. The observation method according to claim 10, further comprising providing, at each of the observation bases, contactless power transmission that supplies power for charging a flying object on standby.

14. The observation method according to claim 10, further comprising performing the data relay for transmitting the observation data by wireless communication.

15. The observation system according to claim 1, wherein the data relay transmits all of the observation data.

16. The observation system according to claim 1, wherein after transmission of the observation data is completed, the first flying object enters the standby condition at the second observation base until another flying object arrives at the second observation base.

17. The observation system according to claim 1, wherein the data relay for transmitting the observation data is performed when the transmitting flying object and the receiving flying object are both at an observation base.

18. The observation system according to claim 1, wherein, upon landing of a flying object at an observation base, observation data stored during the most recent flight of the flying object and observation data transmitted to the flying object during data relay are stored in the storage of an other flying object.

19. The observation system according to claim 1, wherein, upon completion of the data relay, a power transmitter supplies power to charge the flying object by contactless power transmission.

* * * * *